United States Patent
Scheucher

(10) Patent No.: US 8,472,881 B2
(45) Date of Patent: Jun. 25, 2013

(54) COMMUNICATION SYSTEM APPARATUS AND METHOD

(76) Inventor: Karl Frederick Scheucher, Waite Hill, OH (US)

( * ) Notice: Subject to any disclaimer, the term of this patent is extended or adjusted under 35 U.S.C. 154(b) by 677 days.

(21) Appl. No.: 12/749,428

(22) Filed: Mar. 29, 2010

(65) Prior Publication Data

US 2010/0248616 A1  Sep. 30, 2010

Related U.S. Application Data

(60) Provisional application No. 61/165,501, filed on Mar. 31, 2009.

(51) Int. Cl.
*H04B 17/00* (2006.01)

(52) U.S. Cl.
USPC .................... 455/67.11; 455/7; 455/9

(58) Field of Classification Search
USPC .............. 455/7, 9, 11.1, 13.4, 15, 17, 20, 24, 455/25, 63.1
See application file for complete search history.

(56) References Cited

U.S. PATENT DOCUMENTS

| | | | |
|---|---|---|---|
| 3,178,669 A | 4/1965 | Roberts | |
| 3,391,374 A | 7/1968 | Schleicher | |
| 3,543,043 A | 11/1970 | Dunn | |
| 4,193,660 A | 3/1980 | Jaconette | |
| 4,476,574 A | 10/1984 | Struven | |
| D276,495 S | 11/1984 | Sylvia | |
| 4,631,377 A | 12/1986 | Imazeki et al. | |
| 4,905,302 A | 2/1990 | Childress et al. | |
| 4,994,940 A | 2/1991 | Thouvenin et al. | |
| 5,115,514 A * | 5/1992 | Leslie | 455/9 |
| 5,187,423 A | 2/1993 | Marton | |
| 5,346,786 A | 9/1994 | Hodgetts | |
| 5,349,535 A | 9/1994 | Gupta | |
| 5,471,642 A * | 11/1995 | Palmer | 455/17 |
| 5,479,085 A | 12/1995 | Honda et al. | |
| 5,545,491 A | 8/1996 | Farley | |
| 5,563,493 A | 10/1996 | Matsuda et al. | |
| 5,574,980 A * | 11/1996 | Nomura | 455/63.1 |
| 5,631,536 A | 5/1997 | Tseng | |
| 5,694,019 A | 12/1997 | Uchida et al. | |
| 5,696,367 A | 12/1997 | Keith | |
| 5,711,648 A | 1/1998 | Hammerslag | |

(Continued)

FOREIGN PATENT DOCUMENTS

| | | |
|---|---|---|
| DE | 2558456 A | 6/1977 |
| EP | 662725 A1 | 12/1995 |

(Continued)

OTHER PUBLICATIONS

McDowellResearch, MRC-34, 2 Pages, Website, http://www.mcdowellresearch.com/datasheet.php?id=mrc-34.

(Continued)

*Primary Examiner* — Lewis West
(74) *Attorney, Agent, or Firm* — Woodling, Krost and Rust

(57) ABSTRACT

A test device includes a microprocessor and a switching network comprising a plurality of coaxial switches. The test device includes a signal booster, an uplink antenna and a downlink antenna, and a diagnostic device. A power source supplies power to the signal booster and the diagnostic device. The microprocessor controls the switching network which, in turn, controls the interconnection of the power source, the signal booster, the uplink and downlink antennas, and the diagnostic device.

20 Claims, 2 Drawing Sheets

U.S. PATENT DOCUMENTS

| | | | |
|---|---|---|---|
| 5,773,977 A | 6/1998 | Dougherty | |
| 5,792,573 A | 8/1998 | Pitzen et al. | |
| 5,806,948 A | 9/1998 | Rowan et al. | |
| 5,847,537 A | 12/1998 | Parmley | |
| 5,951,229 A | 9/1999 | Hammerslag | |
| 5,956,648 A | 9/1999 | Brennan et al. | |
| 5,959,368 A | 9/1999 | Kubo et al. | |
| 5,998,963 A | 12/1999 | Aarseth | |
| 6,018,227 A | 1/2000 | Kumar et al. | |
| 6,032,020 A | 2/2000 | Cook et al. | |
| 6,085,836 A | 7/2000 | Burris et al. | |
| 6,087,806 A | 7/2000 | Fujoka | |
| 6,094,028 A | 7/2000 | Gu | |
| 6,140,798 A | 10/2000 | Krieger | |
| 6,150,823 A | 11/2000 | Takahashi et al. | |
| 6,154,006 A | 11/2000 | Hatanaka | |
| 6,157,162 A | 12/2000 | Hayashi | |
| 6,195,561 B1 * | 2/2001 | Rose | 455/523 |
| 6,350,149 B1 | 2/2002 | Nakane | |
| 6,361,897 B1 | 3/2002 | Snyder | |
| 6,445,158 B1 | 9/2002 | Bertness et al. | |
| 6,465,986 B1 | 10/2002 | Haba | |
| 6,498,454 B1 | 12/2002 | Pinlam et al. | |
| 6,631,775 B1 | 10/2003 | Chaney | |
| D483,012 S | 12/2003 | Hsu | |
| 6,745,007 B1 * | 6/2004 | Kerek | 455/20 |
| 6,773,849 B2 | 8/2004 | Itoh et al. | |
| 6,788,025 B2 | 9/2004 | Bertness et al. | |
| 6,841,293 B1 | 1/2005 | Dreulle et al. | |
| 6,940,254 B2 | 9/2005 | Nagamine | |
| D511,744 S | 11/2005 | Hsu et al. | |
| D512,373 S | 12/2005 | Tsai et al. | |
| D514,060 S | 1/2006 | Wong et al. | |
| 6,993,286 B2 * | 1/2006 | Zhen et al. | 455/7 |
| D516,020 S | 2/2006 | Wong et al. | |
| D524,728 S | 7/2006 | Watson | |
| 7,157,882 B2 | 1/2007 | Johnson et al. | |
| 7,157,883 B2 | 1/2007 | Johnson et al. | |
| 7,164,257 B2 | 1/2007 | Johnson et al. | |
| D537,408 S | 2/2007 | Aglassinger | |
| 7,176,654 B2 | 2/2007 | Meyer et al. | |
| 7,193,392 B2 | 3/2007 | King et al. | |
| D545,759 S | 7/2007 | Ino et al. | |
| 7,245,108 B2 | 7/2007 | Chertok et al. | |
| 7,253,585 B2 | 8/2007 | Johnson et al. | |
| 7,256,516 B2 | 8/2007 | Buchannan | |
| 7,262,580 B2 | 8/2007 | Meyer et al. | |
| D557,203 S | 12/2007 | Grunow et al. | |
| 7,313,469 B2 | 12/2007 | Wobben | |
| D559,175 S | 1/2008 | Houghton | |
| 7,321,219 B2 | 1/2008 | Meyer et al. | |
| 7,323,847 B2 | 1/2008 | Meyer et al. | |
| D562,228 S | 2/2008 | Okada et al. | |
| 7,327,122 B2 | 2/2008 | Kamenoff | |
| 7,342,381 B2 | 3/2008 | Johnson et al. | |
| D568,239 S | 5/2008 | Okada et al. | |
| 7,378,818 B2 | 5/2008 | Fowler et al. | |
| 7,398,053 B2 * | 7/2008 | Kerek | 455/20 |
| 7,492,124 B2 | 2/2009 | Johnson et al. | |
| 7,504,804 B2 | 3/2009 | Johnson et al. | |
| 7,507,500 B2 | 3/2009 | Donnelly et al. | |
| 7,508,167 B2 | 3/2009 | Meyer et al. | |
| 7,554,290 B2 | 6/2009 | Johnson et al. | |
| 7,557,535 B2 | 7/2009 | Johnson et al. | |
| D601,088 S | 9/2009 | Scheucher | |
| 7,589,500 B2 | 9/2009 | Johnson et al. | |
| 7,609,027 B2 | 10/2009 | Zick et al. | |
| 8,027,699 B2 * | 9/2011 | Zhen et al. | 455/550.1 |
| 8,036,594 B2 * | 10/2011 | Schadler | 455/25 |
| 2001/0020838 A1 | 9/2001 | Malackowski | |
| 2002/0025471 A1 | 2/2002 | Velez et al. | |
| 2002/0096323 A1 | 7/2002 | Burris et al. | |
| 2002/0152476 A1 | 10/2002 | Anderson et al. | |
| 2003/0143455 A1 | 7/2003 | Partington et al. | |
| 2004/0160214 A1 | 8/2004 | Blair et al. | |
| 2004/0201362 A1 | 10/2004 | Borrego Bel et al. | |
| 2005/0017690 A1 | 1/2005 | Kamenoff | |
| 2006/0012342 A1 | 1/2006 | Kamenoff | |
| 2006/0028167 A1 | 2/2006 | Czubay et al. | |
| 2006/0148468 A1 | 7/2006 | Mann | |
| 2006/0267547 A1 | 11/2006 | Godovich | |
| 2007/0099667 A1 | 5/2007 | Graham | |
| 2007/0182158 A1 | 8/2007 | Cerney et al. | |
| 2007/0184339 A1 | 8/2007 | Scheucher | |
| 2007/0188130 A1 | 8/2007 | Scheucher | |
| 2007/0188137 A1 | 8/2007 | Scheucher | |
| 2007/0197207 A1 * | 8/2007 | Carstens et al. | 455/423 |
| 2008/0008928 A1 | 1/2008 | Partin et al. | |
| 2008/0008933 A1 | 1/2008 | Lampe-Onnerud | |
| 2008/0053716 A1 | 3/2008 | Scheucher | |
| 2008/0185993 A1 | 8/2008 | Johnson et al. | |
| 2008/0213652 A1 | 9/2008 | Scheucher | |
| 2009/0029193 A1 | 1/2009 | Onnerud et al. | |
| 2009/0086043 A1 | 4/2009 | Scheucher | |
| 2009/0087729 A1 | 4/2009 | Johnson et al. | |
| 2009/0153101 A1 | 6/2009 | Meyer et al. | |
| 2009/0156118 A1 * | 6/2009 | Schadler | 455/25 |
| 2009/0181296 A1 | 7/2009 | Lampe-Onnerud et al. | |
| 2009/0195216 A1 | 8/2009 | Johnson et al. | |
| 2009/0197152 A1 | 8/2009 | Johnson et al. | |

FOREIGN PATENT DOCUMENTS

| | | |
|---|---|---|
| JP | 043544181 A | 12/1992 |
| JP | 07059124 A | 3/1995 |
| WO | 2007/092955 A2 | 8/2007 |
| WO | 2007/092955 A3 | 6/2008 |
| WO | 2009009176 A2 | 1/2009 |
| WO | 2009009176 A3 | 3/2009 |

OTHER PUBLICATIONS

McDowellResearch, Briefcase Power System, 1 Page, Website, http://www.mcdowellresearch.com/subcategory.php?ID=21.

Automated Business Power, Uninterruptible Power Supply for Javelin CLU, 1 Page, Website, http://www.abpco.com/Uninterruptible_Power_Supply_JAVELIN_CLU.shtml.

Automated Business Power, Uninterruptible Power Transceiver Power Unit Applications, 2 Pages Website, http://www.abpco.com/Uninterruptible_Power_Supply_Transceiver_Battery_Eliminator_App.shtml.

Automated Business Power, Uninterruptible Power Supply Transceiver Battery Eliminator Applications, 2 Pages Website, http://www.abpco.com/uninterruptible_power_supply_transceiver_battery_eliminator_app.shtml.

Motorola, Inc. WMC7300, 2006, pp. 1-2, Maitland, Florida 32794-8133, http://www.motorola.com/mesh/pdf/data_sheet_wmc7300.pdf.

Motorola, Inc. IAP 7300, 2006, pp. 1-2, www.motorola.com/mesh, Maitland, Florida 32794-8133, http://www.motorola.com/mesh/pdf/data_sheet_iap7300.pdf.

International Rectifier, IRF7240 Hexfet Power MOSFET, Mar. 6, 2001, IR World Headquarters: 233 Kansas St., El Segundo, California 90245, www.irf.com.

Diodes Incorporated, PDS1040CTL, Diodes Incorporated. pp. 1-3, www.diodes.com.

Panasonic, Multilayer Chip NTC Thermistors, pp. 1-4.

Kerchner, George A. "Battery Power Online" 2001, Webcom Communications Corp. http://www.batterypoweronline.com/july02LiIonRegulations.htm.

PowerGate LLC, "Cosel 150 Watt Enclosed Single Output Switcher" pp. 1-2, PowerGate LLC 3000 Coronado Dr. Santa Clara, CA 95054.

Acon, Inc., "MH Series, 100-300W" Oct. 21, 2004, pp. 1-17, www.aconinc.com.

CD Media Corporation, "150W DC to AC Power Inverter" 1999-2005, 1 page, http://www.hobbyracer.com/kv-150htm.

National Semiconductor, "LM2936-3.3 Ultra-Low Quiescent Current 3.3V Regulator", Jun. 2002, pp. 1-10, DS101324, National Semiconductor Corporation, www.national.com.

Texas Instruments, "MSP430X15X", SLAS368B, Mar. 2004, pp. 1-64, Texas Instruments, Dallas, Texas.

Transistor Devices, Inc. "2 KW Scaleable Li-Ion AC UPS", Website http://www.tdipower.com/360/ups/ups_360.html, 1 page.

Nexergy, "Portable Power Solutions: Designing the Optimal Portable Power System" pp. 1-8, http://www.nexergy.com/pdf/Designing_Optimal_PPwr.pdf.

Nass, Richard, "Extending Battery Life" EE Times, Jan. 6, 1997, pp. 1-4, http://www.nexergy.com/extending-battery-life.htm.

Motorola, Inc. MWR7300, 2006, pp. 1-2, Motorola Maitland, Florida 32794-8133,http://www.motorola.com/mesh/pdf/data_sheet_mwr7300.pdf.

Motorola, Inc. VMM7300, 2006, pp. 1-2, Motorola Maitland, Florida 32794-8133,http://www.motorola.com/mesh/pdf/data_sheet_vmm7300.pdf.

U.S. Appl. No. 60/951,669, filed Jul. 24, 2007, Inventor Name: Toby Thomas.

U.S. Appl. No. 60/909,873, filed Apr. 3, 2007, Inventor Name: David L. Hoelscher, 28 Pages.

U.S. Appl. No. 29/280,875, filed Jun. 8, 2007, Inventor Name: Karl Scheucher.

U.S. Appl. No. 60/952,240, filed Jul. 26, 2007, Inventor Name: Karl Scheucher.

U.S. Appl. No. 60/911,564, filed Apr. 13, 2007, Inventor Name: Karl Scheucher.

U.S. Appl. No. 29/266,852, filed Sep. 29, 2006, Inventor Name: Karl Scheucher.

U.S. Appl. No. 60/771,771, filed Feb. 9, 2006, Inventor Name: Karl Scheucher.

U.S. Appl. No. 60/781,959, filed Mar. 12, 2006, Inventor Name: Karl Scheucher.

U.S. Appl. No. 60/855,958, filed Nov. 1, 2006, Inventor Name: Karl Scheucher.

U.S. Appl. No. 60/857,079, filed Nov. 6, 2006, Inventor Name: Karl Scheucher.

Watson, R.L. et al; "Refueling Infrastructure for an All-Electric Car Fleet"; Transport and Road Research Laboratory; Research Report 66; 1986; 34 Pages; ISSN 0266-5247; Hobbs the Printers of Southampton, UK.

Meissner, E. et al. "Battery Monitoring and Electrical Energy Management Precondition for future vehicle electric power systems"; Journal of Power Sources; 2003; pp. 79-98; 116; Elsevier Science B.V., Amsterdam 1043, NX.

Santhanagopalan, S. et al. "Online Estimation of the state of charge of a lithium ion cell". Journal of Power Sources; Jun. 19, 2006; pp. 1346-1355; 161; Elsevier Science B.V., Amsterdam 1043, NX.

Plett, G. L. "Extended Kalman filtering for battery management systems of LiPB-based HEV batter packs". Journal of Power Sources; Jun. 9, 2004; pp. 252-292; Elsevier Science B.V., Amsterdam 1043, NX.

U.S. Appl. No. 60/848,148, filed Sep. 29, 2006, Inventor Name: Karl Scheucher.

Overby, Stu. "Best Practices for In-Building Communications" National Public Safety Telecommunications Council (NPSTC) In-Building Working Group Technology Committee, Nov. 12, 2007, 68 pages.

Davidson, Allen et al., "Measurement of Building Penetration Into Medium Buildings at 900 and 1500 MHZ", IEEE Transactions on Vehicular Technology, vol. 46, No. 1, pp. 161-168, Feb. 1997.

Worrell, Mike et al."Phoenix Fire Department Radio System Safety Project", Final Report, Version 1.7, Oct. 8, 2004, Copyright 2004, pp. 1-93. City of Phoenix Fire Department.

Facella, John, "A Primer on In-Building Communications", IACP LEIM Jun. 8, 2006, pp. 1-41.

Jackson, Donny. N.Y. "Network Doesn't Make Grade", http://urgentcomm.com/networks_and_systems/mag/radio_ny_network, Sep. 1, 2008, pp. 1-2, Copyright 2008, Penton Media, Inc.

"Voice Radio Communications Guide for the Fire Service", Oct. 2008,pp. 1-77, U.S. Fire Administration FEMA.

"In-Building/In-Tunnel User Considerations", Aug. 2002, pp. 1-36, Public Safety Wireless Network, http://www.pswn.gov.

Anderson, Leif, et. al. "The Hazard Zone, Firefighter Safety, Trunking, & Portable Radios Session Code 2017", APCO Internation 75th Annual Conference & Expo 2009, Aug. 16-20, 2009, Las Vegas, Nevada. 61 pages.

Facella, John et. al, "Speech Impediments", Fire Chief, p. 68-70, Jun. 2007, Copyright 2007, Penton Business Media.

"APCO Project 25 (P25)" Mar. 18, 2010 13 pages, http://www.apcointl.org/frequency/project25/information.html.

Homeland Security, "National Emergency Communications Plan", Jul. 2008, Rev. Aug. 7, 2008, pp. 1-80.

Mobile Communication Inc., http://www.smoothtalker.com, Aurora, Ont., Brochure, Chapters 1 & 2, One Page.

"White Paper on Emergency Communications", Space & Advanced Communications Research Institute (SACRI) George Washington University, Dec. 12-13, 2005, pp. 1-27, National Conference on Emergency Communications (NCEC) at George Washington University, www.emergencycomconference.org.

NFPA 1 Fire Code 2009 Edition, An International Codes and Standards Organization 4 pages, 1 Batterymarch Park, Quincy, MA 02169-7471.

"ACU-M improving In-Building Communications" Raytheon Application Note: AN-2306-2, 25 pages, Raytheon 5800 Departure Drive Raleigh, NC 27616 919.790.1011 http://www.raytheon.com.

Inventor Name: Karl Scheucher, U.S. Appl. No. 61/165,501, filed Mar. 31, 2009, entitled "Communication System Apparatus and Method".

Inventor Name: Karl Scheucher, U.S. Appl. No. 12/697,289, filed Jan. 31, 2010, entitled "In-Building-Communication Apparatus and Method".

Inventor Name: Karl Scheucher, U.S. Appl. No. 61/148,395, filed Jan. 30, 2009, entitled "In-Building-Communication Apparatus and Method".

Inventor Name: Karl Scheucher, U.S. Appl. No. 12/697,197, filed Jan. 29, 2010, entitled "In-Building-Communication Apparatus and Method".

* cited by examiner ations are available in the USPTO's image file wrapper system.

COMMUNICATION SYSTEM APPARATUS AND METHOD

This invention claims priority to, and specifically incorporates U.S. Provisional Application Ser. No. 61/165,501, filed Mar. 31, 2009, herein by reference hereto, and specifically incorporates U.S. patent application Ser. No. 12/697,289, filed Jan. 31, 2010, herein by reference hereto. Both applic

FIELD OF INVENTION

The invention is an In-Building Communications (IBC) system. The IBC system is used to overcome two-way radio coverage deficits arising from signal attenuation created by buildings or other structures, either man-made or naturally occurring. The deficits arise when a portable two-way radio operating in a duplex radio system cannot communicate through the attenuating structure with the radio infrastructure such as a radio tower or repeater.

BACKGROUND OF THE INVENTION

The National Public Safety Telecommunications Council (NPSTC) report entitled "Best Practices for In-Building Communications" published Nov. 12, 2007 describes the IBC problem as well as the general characteristics of various IBC systems useful to overcome the problem. The National Public Safety Telecommunications Council (NPSTC) report entitled "Best Practices for In-Building Communications" published Nov. 12, 2007 is specifically incorporated herein by reference hereto. A copy of the NPSTC report can be found in the image wrapper file of this patent application as filed as it forms part of provisional application Ser. No. 61/165,501, filed Mar. 31, 2009, supra.

SUMMARY OF THE INVENTION

The test device includes a microprocessor and a switching network comprising a plurality of switches. The test device may be configured in many ways depending on the position or state of the switches. The test device further includes a signal booster, an uplink antenna, a downlink antenna, and a diagnostic device. The test device includes a power source for the signal booster and the diagnostic device. The microprocessor controls the switching network which, in turn, controls the interconnection of the power source, and the components of the device, including, but not limited to the signal booster, the uplink and downlink antennas, and the diagnostic device. The diagnostic device measures different parameters depending on the configuration of the test device.

A first exemplary configuration of the test device may include a first 50 ohm load and a second 50 ohm load. The diagnostic device includes an analyzer port and the signal booster includes an uplink port and a downlink port, and wherein: the uplink port of the signal booster is in electrical communication with the first 50 ohm load, the downlink port of the signal booster is in electrical communication with the second 50 ohm load, the analyzer port is in electrical communication with the uplink antenna, and, the diagnostic device is measuring the efficiency of the uplink antenna.

A second exemplary configuration of the test device may include a first 50 ohm load, a second 50 ohm load, and, the diagnostic device includes an analyzer port, and, and the signal booster includes an uplink port and a downlink port, and wherein: the uplink port of the signal booster is in electrical communication with the first 50 ohm load, the downlink port of the signal booster is in electrical communication with the second 50 ohm load, the analyzer port is in electrical communication with the downlink antenna, and, the diagnostic device is measuring the efficiency of the downlink antenna.

A third exemplary configuration of the test device may include a first 50 ohm load, a second 50 ohm load, and, the diagnostic device includes an analyzer port and a generator port, and the signal booster includes an uplink port and a downlink port, and, wherein: the uplink port of the signal booster is in electrical communication with the first 50 ohm load, said downlink port of the signal booster is in electrical communication with the second 50 ohm load, said analyzer port is in electrical communication with said downlink antenna, said generator port is in electrical communication with the uplink antenna, and the diagnostic device is measuring the efficiency of the uplink antenna to the downlink antenna.

A fourth exemplary configuration of the test device may include a first 50 ohm load, a second 50 ohm load, and, the diagnostic device includes an analyzer port and a generator port, and the signal booster includes an uplink port and a downlink port, and, wherein: the uplink port of the signal booster is in electrical communication with the first 50 ohm load, the downlink port of the signal booster is in electrical communication with the second 50 ohm load, the analyzer port is in electrical communication with the uplink antenna, and the generator port is in electrical communication with the downlink antenna; and the diagnostic device is measuring the efficiency of the downlink antenna to the uplink antenna.

A fifth exemplary configuration of the test device may include a diagnostic device having an analyzer port and a generator port, and the signal booster includes an uplink port and a downlink port, and the analyzer port is in electrical communication with the uplink port of the signal booster, the generator port is in electrical communication with the downlink port of the signal booster, and the diagnostic device is measuring the efficiency of the downlink port to the uplink port of the signal booster.

A sixth exemplary configuration of the device may include includes an analyzer port and a generator port, and said bi-directional amplifier includes an uplink port and a downlink port, and, the analyzer port is in electrical communication with the downlink port of the signal booster, the generator port is in electrical communication with the uplink port of the signal booster, and the diagnostic device is measuring the efficiency of the uplink port to the downlink port of the signal booster.

The diagnostic device may be a radio frequency test device. The microprocessor controls the signal booster and the diagnostic device as to signal magnitude and frequency. The diagnostic device measures the voltage standing wave ratio/return loss versus frequency, insertion loss and/or amplifier gain depending on its configuration.

Each of the switches may be a single pole double throw coaxial switch and includes a single pole, first coaxial contact, and each switch includes second and third coaxial contacts. Each of the switches alternately positionable between: a first position wherein the single pole, first coaxial contact, and the second coaxial contact are electrically connected, or, a second position wherein said single pole, first coaxial contact, and third coaxial contact are electrically connected. Alternatively, the switches ay be single pole single throw coaxial contact switches.

The diagnostic device measures and analyzes intended and interfering radio signals. The radio signals may be received by the uplink antenna or the downlink antenna.

A control device in combination with a signal booster, an uplink antenna and a downlink antenna is disclosed. The control device comprises: a microprocessor and a switching network having a plurality of switches. The control device further includes a signal booster; an uplink antenna and a downlink antenna. The signal booster includes an uplink port and a downlink port. The uplink port of the signal booster is in electrical communication with the uplink antenna and the downlink port of the signal booster is in electrical communication with the downlink antenna. A power source provides power for the signal booster. The microprocessor controls the switching network which, in turn, controls the power source, the signal booster, and, the uplink and downlink antennas to control operation of the signal booster.

Section 6 of the NPSTC report entitled "Best Practices for In-Building Communications" describes "Engineering an In-Building System" including various test procedures. It is one object of this invention to implement an automated version of the battery of tests described in NPSTC report section 6.

It is an object of the instant invention to configure the test device to:
Test Uplink Antenna; Test Downlink Antenna; Test Isolation Uplink to Downlink; Test Isolation Downlink to Uplink; Test Uplink Amplifier; and, Test Downlink Amplifier.

It is an object of the instant invention to configure the control device to operate a signal booster with uplink and downlink antennas including supplying power to the control device.

These and other objects will be best understood when reference is made to the following drawings and description which follow hereinbelow.

DESCRIPTION OF THE INVENTION

Figure 1:
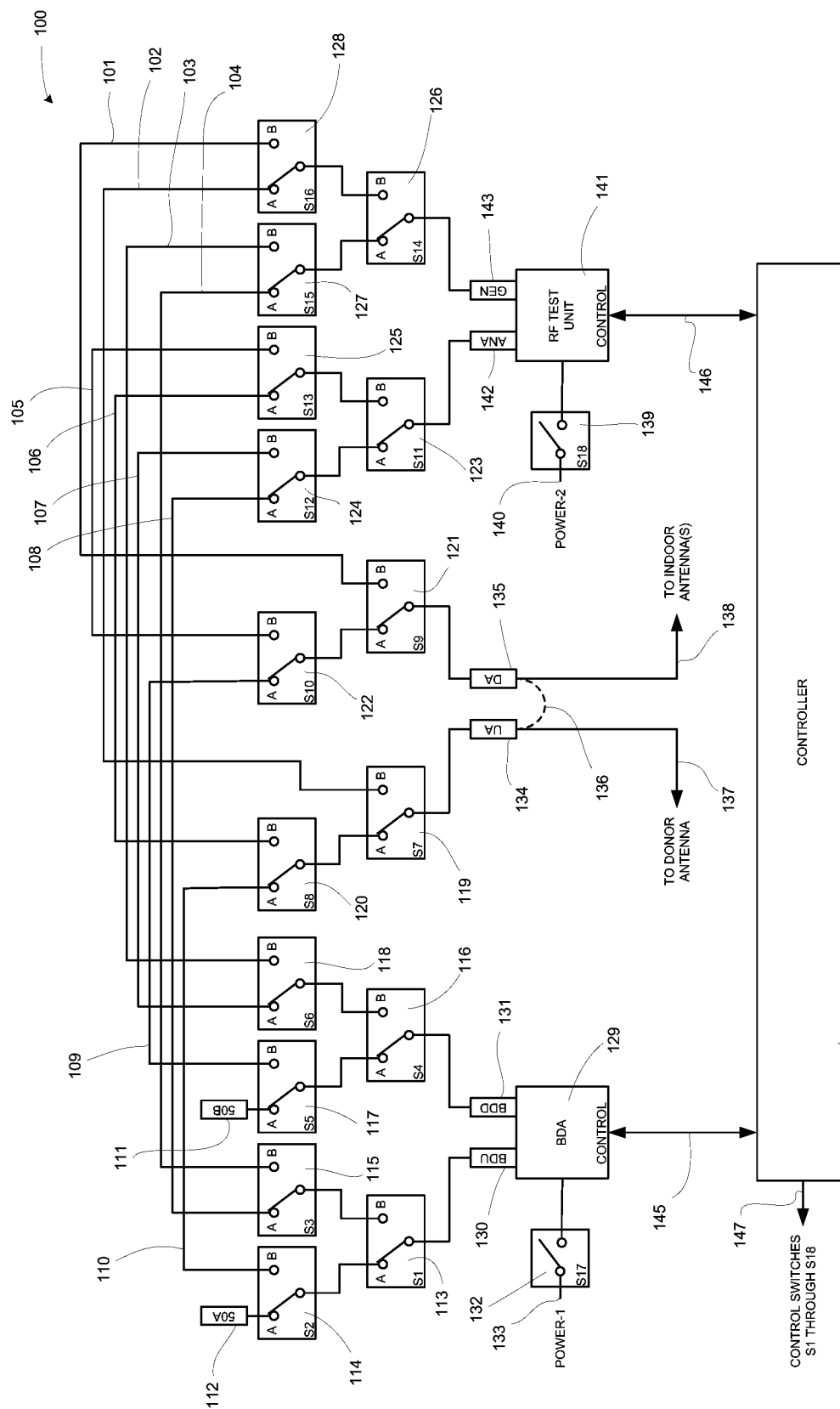
FIG. 1 is a schematic of a test device interconnecting a controller, a bidirectional amplifier, an uplink antenna, a downlink antenna, and, a diagnostic unit.

Referring to FIG. 1, reference numeral 100 refers to an IBC system comprising a signal booster 129. Signal booster 129 may be any type of applicable radio equipment including broadband bidirectional amplifiers such as those manufactured by Cellular Specialties of Manchester, N.H., channelized bidirectional amplifiers, repeaters, or any other radio amplification or signal relay system.

All of the devices schematically illustrated in FIG. 1 may be located in a portable bidirectional device as disclosed in U.S. patent application Ser. No. 12/697,289, filed Jan. 31, 2010, which is specifically incorporated herein by reference hereto. The measurements made and the control performed by the device disclosed herein may be made in the field where the signal booster is located.

The signal booster has two antenna connection ports, port 130 for connection to an outdoor antenna also called a donor or uplink antenna, and port 131 for connection to an indoor antenna or downlink antenna, to a distributed antenna system (DAS), or to radiating cable also called leaky coaxial cable serving as the downlink antenna. In the present invention, rather than connecting ports 130 and 131 directly to their respective antenna systems, these ports are routed through an array of coaxial switches 113 through 118. An exemplary coaxial switch is manufactured by Teledyne Technologies of Thousand Oaks, Calif., model number CCR3 Miniature DC-18 GHz SPDT Switch. Controller unit 144 can program the state of switches 113 through 115 via switch control interface 147 to enable connection of 130 to one of four possible destinations including 50-ohm termination load 112, bus 110, bus 108, or bus 104. Controller unit 144 can program the state of switches 116 through 118 also via switch control interface 147 to enable connection of 131 to one of four possible destinations including 50-ohm termination load 111, bus 109, bus 107, or bus 103. Switch 132 controlled by controller 144 via switch control interface 147 is used to enable power 133 to be connected to energize signal booster 129. Controller 144 also communicates with signal booster 129 via control connection 145 to retrieve status information from 129 or to transmit commands to 129. Connection 145 may be any type of cabling or wiring such as discrete wires, Ethernet connections, other serial or parallel protocol connection such as RS-232 or USB, or may represent a wireless network connection using protocols such as WiFi or Bluetooth. Controller 144 may be implemented using a microcontroller such as Texas Instruments MSP430 series microcontrollers assembled on a printed circuit module including buffer circuits to provide the control connections 147 to the aforementioned switches.

The uplink or donor antenna port 134 and downlink or indoor antenna system port 135 is connected to an array of switches 119 through 122. Controller unit 144 can program the state of switches 119 and 120 via switch control interface 147 to enable connection of 134 to one of three possible destinations including bus 110, bus 106, or bus 102. Controller unit 144 can program the state of switches 121 and 122 also via switch control interface 147 to enable connection of 135 to one of three possible destinations including bus 108, bus 105, or bus 101. Port 134 is connected via conductor 137 to the donor uplink antenna (not shown). Port 135 is connected via conductor 138 to the indoor antenna system. Conductors 137 and 138 are typically low loss coaxial cable such as the type known as RG8/U. Alternatively, conductors 137 and 138 may be detached from ports 134 and 135 respectively and a jumper conductor 136 may be placed to connect or loop port 134 to port 135.

RF test unit 141 may be any type of RF test system such as Anritsu model LMR Master S412D supplied by Anritsu Company of Morgan Hill, Calif., or Bird Electronics model SH-362S supplied by Bird Technologies Group of Solon, Ohio. The RF test unit in the most general case has two connection ports, analyzer port 142 and generator port 143. Ports 142 and 143 are routed through an array of coaxial switches 123 through 128. Controller unit 144 can program the state of switches 123 through 125 via switch control interface 147 to enable connection of 142 to one of four possible destinations including bus 108, bus 107, bus 106, or bus 105. Controller unit 144 can program the state of switches 126 through 128 also via switch control interface 147 to enable connection of 143 to one of four possible destinations including port 104, bus 103, bus 102, or bus 101. Switch 139 controlled by controller 144 via switch control interface 147 is used to enable power 140 to be connected to energize RF test unit 141. Controller 144 also communicates with RF test unit 141 via control connection 146 to retrieve status information from 141 or to transmit commands to 141. Connection 146 may be any type of cabling or wiring such as discrete wires, Ethernet connections, other serial or parallel protocol connection such as RS-232 or USB, or may represent a wireless network connection using protocols such as WiFi or Bluetooth.

The overall interconnection of signal booster ports 130, 131, antenna ports 134, 135, and RF test unit ports 142, 143 can be selected by controller 144 programming all of switches 113 through 126 via switch control interface 147. As mentioned earlier, the power state of signal booster 129 may be controlled by 144 via 147 and switch 132. Likewise, the power state of RF test unit 141 may be controlled by 144 via 147 and switch 139. Switches 137 and 139 may be a standard (not coaxial type) SPST type switch such as a relay or solid state device such as a field effect transistor (FET) device properly sized to switch the voltage and current necessary for the signal booster and RF test unit respectively. When power-enabled, the operative state of signal booster 129 may be configured by controller 144 via control interface connection 145. Likewise, when power-enabled, the operative state of RF test unit 141 may be configured by controller 144 via control interface connection 146. Selectively programming the foregoing states including the states of switches 113 through 126, switches 132 and 139, configuration of signal booster 129 and RF test unit 141, selects one of many operating states. Once the operating state is selectively programmed, information regarding the status of signal booster 129 may be retrieved via control connection 145 and information regarding the status of RF test unit 141 may be retrieved via control connection 146 by controller 144. The combination of a selectively programmed state in conjunction with the corresponding status information is a measurement. Many measurements are possible.

The type of information available from the signal booster 129 to controller 144 via connection 145 may include uplink or downlink power levels, uplink or downlink gain settings including manual and automatic gain contributions, RF filter settings, various fault conditions, and other status information. Likewise the controller may control or program the operation of the signal booster via the same connection 145 including setting of uplink or downlink gains or transmit powers, as well as RF filter settings and other control settings.

The type of information and control exchanged by controller 144 with RF test unit 141 via connection 146 may include power, signal level, and frequency measurements as well as power, signal level, and frequency settings.

Figure 2:
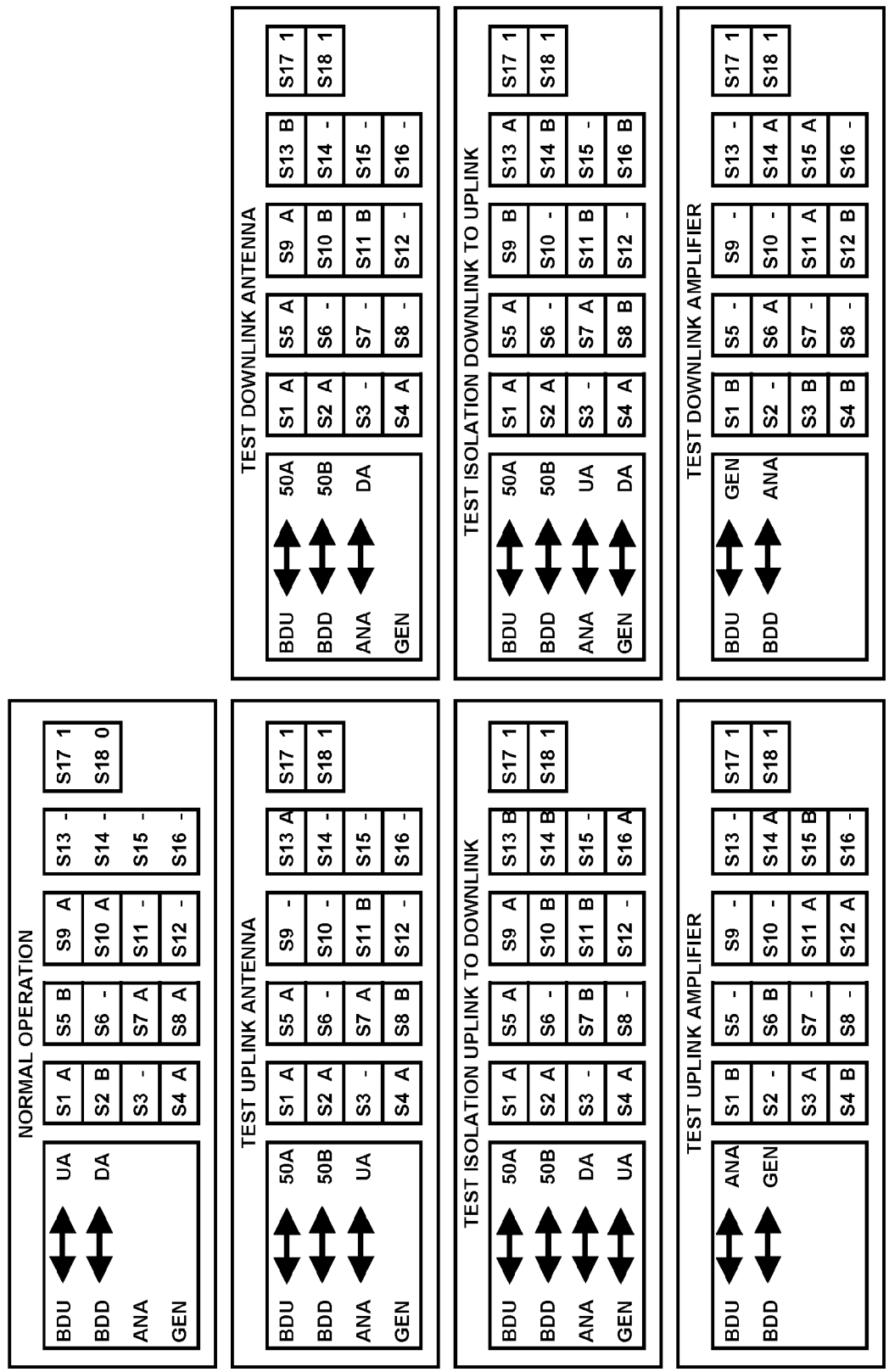
FIG. 2 is a schematic illustrating switch configurations which implement several operating and test conditions.

FIG. 2 shows by way of example several selective programming regimes for switches S1 through S18 where the following correspondence is understood: S1-113, S2-114, . . . , S16-128, S17-132, S18-139. For SPDT switches S1 through S16, setting A represents connection via terminal A, setting B represents connection switched to terminal B, and "-" represents that the setting is immaterial and could be either A or B without differential effect.

Section 6 of the NPSTC report entitled "Best Practices for In-Building Communications" describes "Engineering an In-Building System" including various test procedures. It is one object of this invention to implement an automated version of the battery of tests described in section 6.

It is a particular object of the instant invention to enable configurations corresponding to the testing or operating various functions shown in FIG. 2, including:

Table 1:
1. Normal Operation
2. Test Uplink Antenna
3. Test Downlink Antenna
4. Test Isolation Uplink to Downlink
5. Test Isolation Downlink to Uplink
6. Test Uplink Amplifier
7. Test Downlink Amplifier Calibration of RF test unit 144 may be accomplished by connecting a calibration short circuit device, calibration open circuit device, or calibration load device in place of antenna connection 135 and or in place of antenna connection 134 and programming switch configuration as case 2, 3, 4, or 5 from table 1 above.

A cable 136 may be connected in place of connections 134 and 135 allowing RF test unit ports 142 and 143 to be connected together whenever switch configuration 4 or 5 from table 1 is selected.

Once the switch configuration is selected and programmed, controller 144 can draw on any of the operating modes of signal booster 129 in any combination with any of the operating modes of RF test unit 141 to implement any test or operating mode thereby enabled.

The number of switches and the way those switches are interconnected may be varied in many ways and it is the intent of the invention that any useful pattern of switches and interconnections of switches be included as part of this invention.

It is also the object of this invention to include any kind of amplifier or signal equipment at 129, any type of test unit at 141, and any type of antennas such as dipole, Yagi, patch, or other antennas or loads at ports 134 and 135. A typical Yagi antenna is one manufactured by Larsen of Vancouver, Wash., model YA5800W. An omnidirectional antenna useful for the indoor antenna is one such as Laird Technologies model S8060B.

The invention described herein has been set forth by way of example only. Those skilled in the art will readily recognize that changes may be made to the invention without departing from the spirit and scope of the invention as described in the text and figures of this disclosure.

The invention claimed is:

1. A test device, comprising:
a microprocessor;
a switching network comprising a plurality of switches;
said microprocessor controls said switching network;
a signal booster;
an uplink antenna and a downlink antenna;
a diagnostic device;
a first 50 ohm load;
a second 50 ohm load;
a power source for said signal booster and said diagnostic device;
said microprocessor controls said switching network which, in turn, controls the interconnection of said power source, said signal booster, said uplink and downlink antennas, said diagnostic device, said first 50 ohm load, and said second 50 ohm load;
said diagnostic device includes an analyzer port, and said signal booster includes an uplink port and a downlink port, and wherein: said uplink port of said signal booster is in electrical communication with said first 50 ohm load, said downlink port of said signal booster is in electrical communication with said second 50 ohm load, said analyzer port is in electrical communication with said uplink antenna, and, said diagnostic device is measuring the efficiency of said uplink antenna.

2. A test device as claimed in claim 1, wherein each of said switches is a single pole double throw coaxial switch and includes a single pole, first coaxial contact, and each switch includes second and third coaxial contacts, each of said switches alternately positionable between: a first position wherein said single pole, first coaxial contact, and said second coaxial contact are electrically connected, or, a second position wherein said single pole, first coaxial contact, and said third coaxial contact are electrically connected.

3. A test device as claimed in claim 1, wherein said microprocessor controls said signal booster and said diagnostic device as to signal magnitude and frequency.

4. A test device as claimed in claim 1, wherein said diagnostic device measures the voltage standing wave ratio/return loss versus frequency, insertion loss and/or amplifier gain.

5. A test device as claimed in claim 1, wherein each of said switches is a single pole single throw coaxial contact switch.

6. A test device as claimed in claim 1, wherein said diagnostic device measures and analyzes intended and interfering radio signals.

7. A test device as claimed in claim 6 wherein said radio signals are received by said uplink antenna.

8. A test device as claimed in claim 6 wherein said radio signals are received by said downlink antenna.

9. A test device as claimed in claim 1, comprising a circuit connecting said uplink antenna wherein said measuring by said diagnostic device is used to determine a distance to a fault in said circuit.

10. A test device, comprising:
a microprocessor;
a switching network comprising a plurality of switches;
said microprocessor controls said switching network;
a signal booster;
an uplink antenna and a downlink antenna;
a diagnostic device;
a first 50 ohm load;
a second 50 ohm load;
a power source for said signal booster and said diagnostic device;
said microprocessor controls said switching network which, in turn, controls the interconnection of said power source, said signal booster, said uplink and downlink antennas, said diagnostic device, said first 50 ohm load, and said second 50 ohm load;
said diagnostic device includes an analyzer port, and said signal booster includes an uplink port and a downlink port, and wherein: said uplink port of said signal booster is in electrical communication with said first 50 ohm load, said downlink port of said signal booster is in electrical communication with said second 50 ohm load, said analyzer port is in electrical communication with said downlink antenna, and, said diagnostic device is measuring the efficiency of said downlink antenna.

11. A test device as claimed in claim 10, comprising a circuit connecting said downlink antenna wherein said measuring by said diagnostic device is used to determine a distance to a fault in said circuit.

12. A test device, comprising:
a microprocessor;
a switching network comprising a plurality of switches;
said microprocessor controls said switching network;
a signal booster;
an uplink antenna and a downlink antenna;
a diagnostic device;
a first 50 ohm load;
a second 50 ohm load;
a power source for said signal booster and said diagnostic device;
said microprocessor controls said switching network which, in turn, controls the interconnection of said power source, said signal booster, said uplink and downlink antennas, said diagnostic device, said first 50 ohm load, and said second 50 ohm load;
said diagnostic device includes an analyzer port and a generator port, and said signal booster includes an uplink port and a downlink port, and, wherein: said uplink port of said signal booster is in electrical communication with said first 50 ohm load, said downlink port of said signal booster is in electrical communication with said second 50 ohm load, said analyzer port is in electrical communication with said downlink antenna, said generator port is in electrical communication with said uplink antenna, and said diagnostic device is measuring the efficiency of said uplink antenna to said downlink antenna.

13. A test device, comprising:
a microprocessor;
a switching network comprising a plurality of switches;
said microprocessor controls said switching network;
a signal booster;
an uplink antenna and a downlink antenna;
a diagnostic device;
a first 50 ohm load;
a second 50 ohm load;
a power source for said signal booster and said diagnostic device;
said microprocessor controls said switching network which, in turn, controls the interconnection of said power source, said signal booster, said uplink and downlink antennas, said diagnostic device, said first 50 ohm load, and said second 50 ohm load;
said diagnostic device includes an analyzer port and a generator port, and said signal booster includes an uplink port and a downlink port, and, wherein: said uplink port of said signal booster is in electrical communication with said first 50 ohm load, said downlink port of said signal booster is in electrical communication with said second 50 ohm load, said analyzer port is in electrical communication with said uplink antenna, and said generator port is in electrical communication with said downlink antenna; and said diagnostic device is measuring the efficiency of said downlink antenna to said uplink antenna.

14. A test device, comprising:
a microprocessor;
a switching network comprising a plurality of switches;
said microprocessor controls said switching network;
a signal booster;
an uplink antenna and a downlink antenna;
a diagnostic device;
a power source for said signal booster and said diagnostic device;
said microprocessor controls said switching network which, in turn, controls the interconnection of said power source, said signal booster, said uplink and downlink antennas, ans said diagnostic device;
said diagnostic device includes an analyzer port and a generator port, and said signal booster includes an uplink port and a downlink port, and said analyzer port is in electrical communication with said uplink port of said signal booster, said generator port is in electrical communication with said downlink port of said signal booster, and said diagnostic device is measuring the efficiency of said downlink port to said uplink port of said signal booster.

15. A test device, comprising:
a microprocessor;
a switching network comprising a plurality of switches;
said microprocessor controls said switching network;
a signal booster;
an uplink antenna and a downlink antenna;
a diagnostic device;
a power source for said signal booster and said diagnostic device;
said microprocessor controls said switching network which, in turn, controls the interconnection of said power source, said signal booster, said uplink and downlink antennas, ans said diagnostic device;
said diagnostic device includes an analyzer port and a generator port, and said signal booster includes an uplink port and a downlink port, and, said analyzer port is in electrical communication with said downlink port of said signal booster, said generator port is in electrical communication with said uplink port of said signal booster, and said diagnostic device is measuring the efficiency of said uplink port to said downlink port of said signal booster.

16. A test device as claimed in claim 10, wherein each of said switches is a single pole double throw coaxial switch and includes a single pole, first coaxial contact, and each switch includes second and third coaxial contacts, each of said switches alternately positionable between: a first position wherein said single pole, first coaxial contact, and said second coaxial contact are electrically connected, or, a second position wherein said single pole, first coaxial contact, and said third coaxial contact are electrically connected.

17. A test device as claimed in claim 12, wherein each of said switches is a single pole double throw coaxial switch and includes a single pole, first coaxial contact, and each switch includes second and third coaxial contacts, each of said switches alternately positionable between: a first position wherein said single pole, first coaxial contact, and said second coaxial contact are electrically connected, or, a second position wherein said single pole, first coaxial contact, and said third coaxial contact are electrically connected.

18. A test device as claimed in claim 13, wherein each of said switches is a single pole double throw coaxial switch and includes a single pole, first coaxial contact, and each switch includes second and third coaxial contacts, each of said switches alternately positionable between: a first position wherein said single pole, first coaxial contact, and said second coaxial contact are electrically connected, or, a second position wherein said single pole, first coaxial contact, and said third coaxial contact are electrically connected.

19. A test device as claimed in claim 14, wherein each of said switches is a single pole double throw coaxial switch and includes a single pole, first coaxial contact, and each switch includes second and third coaxial contacts, each of said switches alternately positionable between: a first position wherein said single pole, first coaxial contact, and said second coaxial contact are electrically connected, or, a second position wherein said single pole, first coaxial contact, and said third coaxial contact are electrically connected.

20. A test device as claimed in claim 15, wherein each of said switches is a single pole double throw coaxial switch and includes a single pole, first coaxial contact, and each switch includes second and third coaxial contacts, each of said switches alternately positionable between: a first position wherein said single pole, first coaxial contact, and said second coaxial contact are electrically connected, or, a second position wherein said single pole, first coaxial contact, and said third coaxial contact are electrically connected.

* * * * *